US008811728B2

(12) United States Patent
Otsuka

(10) Patent No.: US 8,811,728 B2
(45) Date of Patent: Aug. 19, 2014

(54) IMAGE PROCESSING APPARATUS AND COMPUTER PROGRAM PRODUCT

(75) Inventor: Takeshi Otsuka, Tokyo (JP)

(73) Assignee: Olympus Corporation, Tokyo (JP)

( * ) Notice: Subject to any disclaimer, the term of this patent is extended or adjusted under 35 U.S.C. 154(b) by 1057 days.

(21) Appl. No.: 12/363,970

(22) Filed: Feb. 2, 2009

(65) Prior Publication Data

US 2009/0202120 A1    Aug. 13, 2009

(30) Foreign Application Priority Data

Feb. 8, 2008  (JP) .................................. 2008-029693

(51) Int. Cl.
*G06K 9/00* (2006.01)
*G01J 3/32* (2006.01)
(52) U.S. Cl.
CPC ........................................ *G01J 3/32* (2013.01)
USPC ............ 382/162; 382/128; 382/167; 382/275
(58) Field of Classification Search
CPC ......... G06K 9/00; G06K 9/46; G06K 9/0014; G06K 9/00134; G06K 9/40; G06K 9/2018; G06K 9/4652
USPC ............ 382/162, 128, 132, 275, 167; 378/86, 378/98.9, 98.11, 98.12; 250/226, 573, 250/339.01, 339.07, 338.5; 348/79, 223.1; 354/402–425
See application file for complete search history.

(56) References Cited

U.S. PATENT DOCUMENTS

| 5,817,462 | A  | * | 10/1998 | Garini et al. ...................... 506/9 |
| 6,040,857 | A  | * | 3/2000 | Hirsh et al. .................... 348/241 |
| 7,489,346 | B2 | * | 2/2009 | Mizukura et al. .......... 348/223.1 |
| 8,000,776 | B2 | * | 8/2011 | Gono ............................ 600/476 |
| 8,160,331 | B2 | * | 4/2012 | Otsuka .......................... 382/128 |
| 8,306,317 | B2 | * | 11/2012 | Tani ............................... 382/162 |
| 8,503,743 | B2 | * | 8/2013 | Otsuka .......................... 382/128 |
| 2005/0073685 | A1 | * | 4/2005 | Arai .............................. 356/419 |
| 2009/0180684 | A1 | * | 7/2009 | Tani ............................... 382/162 |
| 2009/0274351 | A1 | * | 11/2009 | Otsuka .......................... 382/128 |

(Continued)

FOREIGN PATENT DOCUMENTS

| JP | 07-120324 | 5/1995 |
| JP | 08-313349 | 11/1996 |

(Continued)

OTHER PUBLICATIONS

Abe et al., "Color Correction of Pathological Images Based on Dye Amount Quantification", Optical Review vol. 12, No. 4 (2005) 293-300.*

(Continued)

*Primary Examiner* — Mekonen Bekele
(74) *Attorney, Agent, or Firm* — Scully, Scott, Murphy & Presser, P.C.

(57) ABSTRACT

An image processing apparatus uses an estimation operator to estimate a spectroscopic property. The image processing apparatus includes an effect extent analyzing unit which analyzes, based on the estimation operator, a relative extent of an effect on the spectroscopic property against a noise in a wavelength axis.

8 Claims, 10 Drawing Sheets

(56) References Cited

U.S. PATENT DOCUMENTS

| | | | |
|---|---|---|---|
| 2010/0141752 A1* | 6/2010 | Yamada et al. | 348/79 |
| 2010/0189321 A1* | 7/2010 | Otsuka | 382/128 |
| 2010/0195903 A1* | 8/2010 | Tani | 382/162 |
| 2010/0322502 A1* | 12/2010 | Otsuka et al. | 382/133 |
| 2012/0250960 A1* | 10/2012 | Otsuka | 382/128 |

FOREIGN PATENT DOCUMENTS

| | | |
|---|---|---|
| JP | 2001-045298 | 2/2001 |
| JP | 2001-099710 | 4/2001 |
| JP | 2001-331153 | 11/2001 |
| JP | 2005/069965 | 3/2005 |
| JP | 2005-167444 | 6/2005 |
| JP | 2005-331394 | 12/2005 |
| JP | 2007-110338 | 4/2007 |
| JP | 2007/278950 | 10/2007 |
| WO | WO 2005/114147 A1 | 12/2005 |
| WO | WO 2007/097171 A1 | 8/2007 |

OTHER PUBLICATIONS

Keiko Fujii et al., "Development of support systems for pathology using spectral transmittance—The quantification method of stain conditions", pp. 1516-1522. Medical Imaging 2002: Image Processing, Milan, Proceedings of SPIE vol. 4684 (2002).*

Fujii, Keiko et al., "Development of support systems for pathology using spectral transmittance—The quantification method of stain conditions", Proceedings of SPIE (2002), pp. 1516-1523, vol. 4684.

Abe, Tokiya et al., "Color Correction of Pathological Images Based on Dye Amount Quantification", Optical Review (2005), pp. 293-300, vol. 12, No. 4.

Japanese Official Action dated Oct. 9, 2012 from related application JP 2008-029693.

* cited by examiner

COLOR FILTER ARRAY OF CCD

PIXEL ARRAY OF EACH OF R, G, AND B BANDS

IMAGE PROCESSING APPARATUS AND COMPUTER PROGRAM PRODUCT

CROSS-REFERENCE TO RELATED APPLICATIONS

This application is based upon and claims the benefit of priority from Japanese Patent Application No. 2008-029693, filed on Feb. 8, 2008, the entire contents of which are incorporated herein by reference.

BACKGROUND OF THE INVENTION

1. Field of the Invention

The present invention relates to an image processing apparatus which uses an estimation operator to estimate a spectroscopic property, and to a reliability evaluation method and a computer program product of the image processing apparatus.

2. Description of the Related Art

As a physical quantity which shows a physical property inherent to an object, there is a spectrum of a spectral transmittance. A spectral transmittance is a physical quantity which shows a ratio of transmitted light to incident light at each wavelength and is, as being different from color information such as an RGB value depending on a change of illumination light, information whose value does not change due to an exogenous influence and which is inherent to an object. Therefore, the spectral transmittance is used in various fields as information for reproducing a color inherent to the object itself. For example, a technology of estimating the spectral transmittance as one example of spectroscopic properties is utilized for an analysis on an image capturing a specimen in a field of a pathological diagnosis using an organism tissue specimen, specifically a pathological specimen.

In the pathological diagnosis, it is widely prevalent, for obtaining various findings, to use a microscope to perform an observation through a magnification after a block specimen obtained by an organ extraction or a pathological specimen obtained by a needle biopsy is sliced into thin sections whose thickness each is approximately several micrometers. In particular, a transmission observation using an optical microscope is one of the most common observation methods for the reason, besides the fact that its equipment is relatively inexpensive and can be easily handled, that the transmission observation has been performed historically from a long time ago. In this case, since the sliced specimen hardly absorbs and disperses light and is almost transparent and colorless, the sliced specimen generally undergoes staining with a stain prior to the observation.

Though there have been various kinds of proposals for a staining method and the total number of the kinds reaches a hundred or more, a hematoxylin-eosin staining in which two of a hematoxylin whose color is bluish violet and an eosin whose color is red are used as a stain (hereinafter referred to as "H&E staining") is normally used especially for a pathological specimen.

The hematoxylin is a natural substance extracted from a plant and does not have a nature of staining in itself. However, a hematin as an oxide of the hematoxylin is a basophilic stain and combines with a negatively charged substance. Since a deoxyribonucleic acid (DNA) included in a cell nucleus is negatively charged due to a phosphate group included as a constituent, the deoxyribonucleic acid combines with the hematin and is stained bluish violet. Since it is common to tend to use the hematoxylin as a stain name, the description below will be made by following this tendency though it is not the hematoxylin but the hematin as the oxide of the hematoxylin that has the nature of staining as described above. On the other hand, the eosin is an acidophilic stain and combines with a positively charged substance. It depends on a pH environment whether an amino acid and a protein are charged positively or negatively, and an amino acid and a protein have a tendency of being charged positively under an acid environment. Therefore, an eosin solution to which an acetic acid is added is sometimes used. A protein included in a cell nucleus combines with the eosin and is stained red or pink.

The specimen (stained specimen) after the H&E staining can be visually recognized with ease since a cell nucleus, a bone tissue, and the like are stained bluish violet and a cell cytoplasm, a connective tissue, a red blood cell, and the like are stained red. As a result of this, an observer can grasp a size and a positional relationship of constituents including the cell nucleus which constitute the organism, and can morphologically judge a condition of the stained specimen.

The observation of the stained specimen can be performed by displaying the stained specimen obtained through a multiband imaging on a display screen of an external device, except for the visual check by the observer. In the case of displaying on a display screen, a processing of estimating a spectral transmittance at each point of the specimen based on the captured multiband image; a processing of estimating an amount of the stain staining the specimen based on the estimated spectral transmittance; a processing of correcting a color of the image based on the estimated stain amount; and the like are performed. Then, characteristics of a camera, a dispersion of a stain condition, and the like are corrected, so that an RGB image of the specimen is composed for the display. FIG. 13 shows an example of the composed RGB image. When the stain amount is appropriately estimated, a specimen with a deep stain and a specimen with a light stain can be corrected as an image whose color is comparable to an appropriately stained specimen. Therefore, estimating a spectral transmittance of a stained specimen with high precision results in realizing a high precision in estimating an amount of a stain fixed to the stained specimen, correcting a dispersion of the staining, and the like.

As a method of estimating the spectral transmittance at each point of the specimen from the multiband image of the specimen, for example, an estimation method through a principal component analysis (see "Development of support systems for pathology using spectral transmittance—The quantification method of stain conditions", Proceedings of SPIE, Vol. 4684, 2002, p. 1516-1523, for example), an estimation method through a Wiener estimation (see "Color Correction of Pathological Images Based on Dye Amount Quantification", OPTICAL REVIEW, Vol. 12, No. 4, 2005, p. 293-300, for example), and the like can be quoted. The Wiener estimation, which is widely known as one of linear filtering methods of estimating an original signal from an observed signal on which a noise is superimposed, is a method of minimizing errors by taking statistical properties of an observation target and properties of a noise (observed noise) into consideration. Since a signal from a camera includes some sort of noise, the Wiener estimation is fairly useful as the method of estimating an original signal.

Here, a method of estimating a spectral transmittance at each point of a specimen based on a multiband image of the specimen through the Wiener estimation will be explained.

First, a multiband image of a specimen is captured. For example, by using a technology disclosed in Japanese Patent Application No. H7-120324, a multiband image is captured via a frame sequential method while rotating and switching sixteen band-pass filters by a filter wheel. By this, a multiband image having pixel values for sixteen bands at each point of the specimen can be obtained. Though a stain essentially ranges in three dimensions within a stained specimen as an observation target, the stain cannot be captured as a three dimensional image as it is in a normal transmission observation system and is observed as a two dimensional image obtained through a projection of illumination light passing through the specimen on an imaging element of the camera. Therefore, each point described here means a point, corresponding to each pixel of the projected imaging element, on the specimen.

With respect to a given point x in the captured multiband image, a relationship expressed by the following equation (1) based on a response system of the camera is true between a pixel value g(x, b) in a band b and a spectral transmittance t(x, λ) at a corresponding point on the specimen.

$$g(x,b)=\int_\lambda f(b,\lambda)s(\lambda)e(\lambda)t(x,\lambda)d\lambda+n(b) \quad (1)$$

A symbol λ represents a wavelength, a symbol f(b, λ) represents a spectral transmittance of a No. b filter, a symbol s(λ) represents a property of a spectral sensitivity of a camera, a symbol e(λ) represents a property of a spectral radiation of an illumination, and a symbol n(b) represents an observation noise in the band b. The symbol b, which is a serial number for identifying a band, is an integer value satisfying 1≤b≤16.

In an actual calculation, the following equation (2) obtained via a discretization of equation (1) in a wavelength direction.

$$G(x)=F\text{SET}(x)+N \quad (2)$$

Provided that the number of samples in the wavelength direction is D and the number of bands is B (here B=16), a symbol G(x) represents a matrix which is formed by B rows and one column and deals with the pixel value g(x, b) at the point x. In the same way, a symbol T(x) represents a matrix which is formed by D rows and one column and deals with the t(x, λ), and a symbol F represents a matrix which is formed by B rows and D columns and deals with the f(b, λ). On the other hand, a symbol S represents a diagonal matrix which is formed by D rows and D columns and its diagonal elements deal with the s(λ). In the same way, a symbol E represents a diagonal matrix which formed by D rows and D columns and its diagonal elements deal with the e(λ). A symbol N represents a matrix which is formed by B rows and one column and deals with the n(b). In equation (2), since formulas with respect to multiple bands are aggregated by using matrices, a specific number for the "b", which is variable and represents what band it is, is not explicitly described. Besides, an integral with respect to the wavelength λ is replaced by a product of the matrices.

Here, a matrix H defined by the following equation (3) is introduced to make the description easier. This H is also called "system matrix".

$$H=FSE \quad (3)$$

Next, a spectral transmittance at each point of the specimen is estimated from the captured multiband image by using the Weiner estimation. An estimation value $\hat{T}(x)$ of the spectral transmittance can be calculated by the following equation (4). It should be noted that the symbol $\hat{T}$ means that a hat ( ^ ) representing an estimation value is attached on top of T.

$$\hat{T}(x)=WG(x) \quad (4)$$

Here, a symbol W is expressed by the following equation (5) and called "Wiener estimation matrix" or "estimation operator used for the Wiener estimation". In the following explanation, the W is simply referred to as "estimation operator".

$$W=R_{SS}H^t(HR_{SS}H^t+R_{NN})^{-1} \quad (5)$$

where $(\ )^t$ means a transposed matrix and $(\ )^{-1}$ means an inverse matrix.

A symbol $R_{SS}$ represents a matrix formed by D rows and D columns and represents an autocorrelation matrix of the spectral transmittance of the specimen. In addition, a symbol $R_{NN}$ represents a matrix formed by B rows and B columns and represents an autocorrelation matrix of a noise of a camera to be used for imaging.

When the spectral transmittance $\hat{T}(x)$ is estimated in this way, a stain amount at a corresponding point of the specimen is estimated based on the $\hat{T}(x)$. As an estimation target, there are three kinds of stains, which are a hematoxylin that, corresponding to a first stain amount, stains the cell nucleus; an eosin that, corresponding to a second stain amount, stains the cell cytoplasm; and an eosin that, corresponding to a third stain amount, stains the red blood cell. Here, the hematoxylin is abbreviated as a stain H, the eosin staining the cell cytoplasm as a stain E, and the eosin staining the red blood cell as a stain R, respectively. Strictly speaking, the red blood cell even in a state of not being stained has an inherent color in itself and is observed with the color inherent to the red blood cell and the color of the eosin altered in the staining process overlapped after the H&E staining. Therefore, a color produced in combination with both colors is called as the stain R, to be precise.

It is generally known in a light transmissive substance that a Lambert-Beer law expressed by the following equation (6) is true between an intensity $I_0(\lambda)$ of incident light and an intensity $I(\lambda)$ of outgoing light at each wavelength λ.

$$\frac{I(\lambda)}{I_0(\lambda)} = e^{-k(\lambda)\cdot d} \quad (6)$$

A symbol k(λ) indicates a value which is specific to a substance and determined depending on the wavelength, and a symbol d means a thickness of the substance. Besides, the left side of equation (6) indicates the spectral transmittance.

When the H&E stained target specimen is stained by the three kinds of stains, i.e., the stain H, the stain E, and the stain R, the following equation (7) based on the Lambert-Beer law is true at each wavelength λ.

$$\frac{I(\lambda)}{I_0(\lambda)} = e^{-(k_H(\lambda)\cdot d_H + k_E(\lambda)\cdot d_E + k_R(\lambda)\cdot d_R)} \quad (7)$$

Here, each of symbols $k_H(\lambda)$, $k_E(\lambda)$, and $k_R(\lambda)$ represents a symbol k(λ) corresponding to each of the stain H, the stain E, and the stain R. Besides, each of symbols $d_H$, $d_E$, and $d_R$ is a virtual thickness of each of the stain H, the stain E, and the stain R at each point, corresponding to each image position of the multiband image, of the specimen. Though a concept of the "thickness" is not accurate since a stain is essentially present by dispersing over the specimen, the thickness works as a marker, indicating how much amount of stain is present, for a relative amount of stains, compared to a case of assuming that the specimen is stained with a single stain. In other words, it is possible to say that each of the $d_H$, $d_E$, and $d_R$ represents each amount of the stain H, the stain, E, and the stain R. By preparing a specimen stained with a single stain in advance and measuring the spectral transmittance thereof by using a spectrometer, the $k_H(\lambda)$, $k_E(\lambda)$, and $k_R(\lambda)$ can be easily obtained based on the Lambert-Beer law.

An extraction of a logarithm from both sides of equation (7) is expressed by the following equation (8).

$$-\log\frac{I(\lambda)}{I_0(\lambda)} = k_H(\lambda)\cdot d_H + k_E(\lambda)\cdot d_E + k_R(\lambda)\cdot d_R \quad (8)$$

When an element corresponding to the wavelength λ of the spectral transmittance data $\hat{T}(x)$ estimated by using equation (4) is $\hat{t}(x,\lambda)$ and the $\hat{t}t(x,\lambda)$ is substituted into equation (8), the following equation (9) is obtained.

$$-\log \hat{t}(x,\lambda) = k_H(\lambda)\cdot d_H + k_E(\lambda)\cdot d_E + k_R(\lambda)\cdot d_R \quad (9)$$

Here, since the $d_H$, $d_E$, and $d_R$ are unknown variables in equation (9), when simultaneous equations are set up from equation (9) with respect to at least three different wavelengths λ, they can be solved. To further enhance the accuracy, simultaneous equations may be set up from equation (9) with respect to four or more different wavelengths λ and a multiple regression analysis may be performed.

Then, when the stain amount at a point of the specimen is estimated in this way, the stain amount at each point of the specimen is adjusted to an appropriate stain condition based on the estimated stain amount and an image of the specimen is composed.

SUMMARY OF THE INVENTION

An image processing apparatus which uses an estimation operator to estimate a spectroscopic property according to one aspect of the present invention includes an effect extent analyzing unit which analyzes, based on the estimation operator, a relative extent of an effect on the spectroscopic property against a noise in a wavelength axis.

An image processing apparatus according to another aspect of the present invention includes: a spectroscopic property estimating unit which uses an estimation operator to estimate, based on an image capturing a stained specimen, a spectroscopic property of the stained specimen; a weighting factor obtaining unit which obtains a weighting factor of the spectroscopic property at each wavelength; and a stain amount estimating unit which estimates a stain amount of the stained specimen based on the spectroscopic property estimated by the spectroscopic property estimating unit and on the weighting factor obtained by the weighting factor obtaining unit at each wavelength.

A reliability evaluation method according to still another aspect of the present invention is of an image processing apparatus which uses an estimation operator to estimate a spectroscopic property, based on the estimation operator. In the reliability evaluation method, a relative extent of an effect on the spectroscopic property against a noise in a wavelength axis is analyzed and a reliability of the image processing apparatus is evaluated based on the analyzed against-noise relative effect extent.

A computer program product according to still another aspect of the present invention has a computer readable recording medium including programmed instructions for estimating a spectroscopic property by using an estimation operator. The instructions, when executed by a computer, cause the computer to perform analyzing, based on the estimation operator, a relative extent of an effect on the spectroscopic property against a noise in a wavelength axis.

A computer program product according to still another aspect of the present invention has a computer readable recording medium including programmed instructions for estimating a spectroscopic property by using an estimation operator. The instructions, when executed by a computer, cause the computer to perform: estimating, based on an image capturing a stained specimen, a spectroscopic property of the stained specimen by using the estimation operator; obtaining a weighting factor of the spectroscopic property at each wavelength; and estimating a stain amount of the stained specimen based on the estimated spectroscopic property and on the obtained weighting factor at each wavelength.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
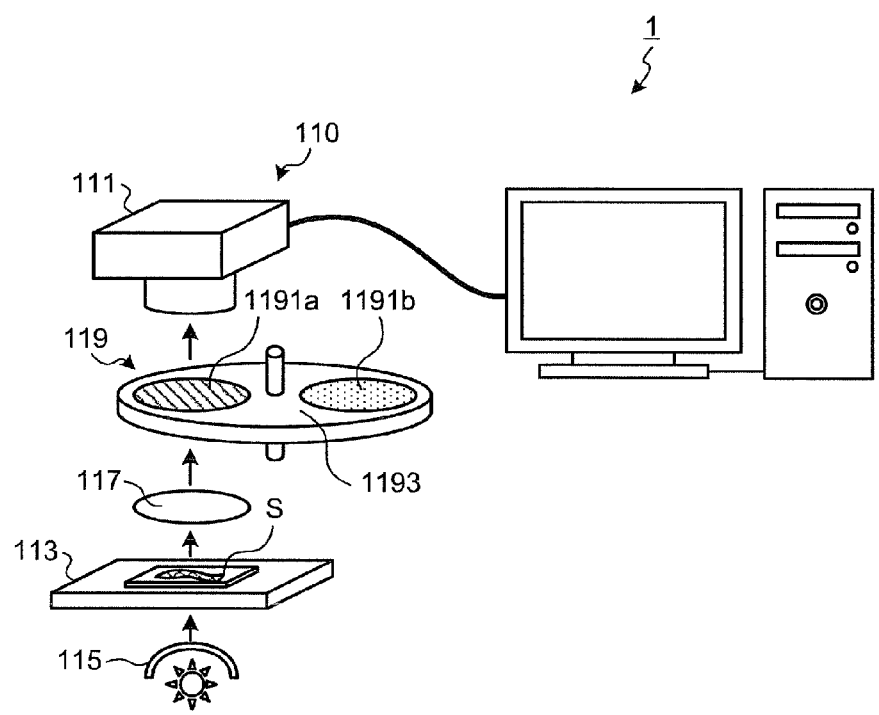
FIG. 1 shows a structure of an image processing apparatus.

Exemplary embodiments of the present invention will be explained in detail below with reference to the accompanying drawings. In the embodiment, an organism tissue specimen which has undergone the H&E staining (stained specimen) is configured to be an imaging target. A spectrum at each point of the stained specimen is estimated by using the Wiener estimation based on a captured multiband image and a stain amount at each point of the specimen is estimated. It should be noted that the present invention is not limited by the embodiments. Besides, it should be noted that a part which is common through the description in the drawings will be assigned with a common reference symbol.

First Embodiment

FIG. 1 is an explanatory view of a structure of an image processing apparatus according to a first embodiment. As shown in FIG. 1, an image processing apparatus 1 is constituted by a computer such as a personal computer and includes an image obtaining unit 110 which obtains a multiband image of a stained specimen.

The image obtaining unit 110 performs an image obtaining operation to capture an image of the stained specimen as a target for estimating a stain amount after the H&E staining (hereinafter referred to as "target specimen") and obtain a multiband image with six bands. The image obtaining unit 110 includes an RGB camera 111, a specimen retaining unit 113, an illumination unit 115, an optical system 117, a filter unit 119, and the like. The RGB camera 111 has an imaging element such as a CCD. On the specimen retaining unit 113, a target specimen S is placed. The illumination unit 115 gives a transmissive illumination onto the target specimen S placed on the specimen retaining unit 113. The optical system 117 focuses transmitted light from the target specimen S to form images. The filter unit 119 serves to limit a wavelength of light for the image forming to a predetermined range.

Figure 2:
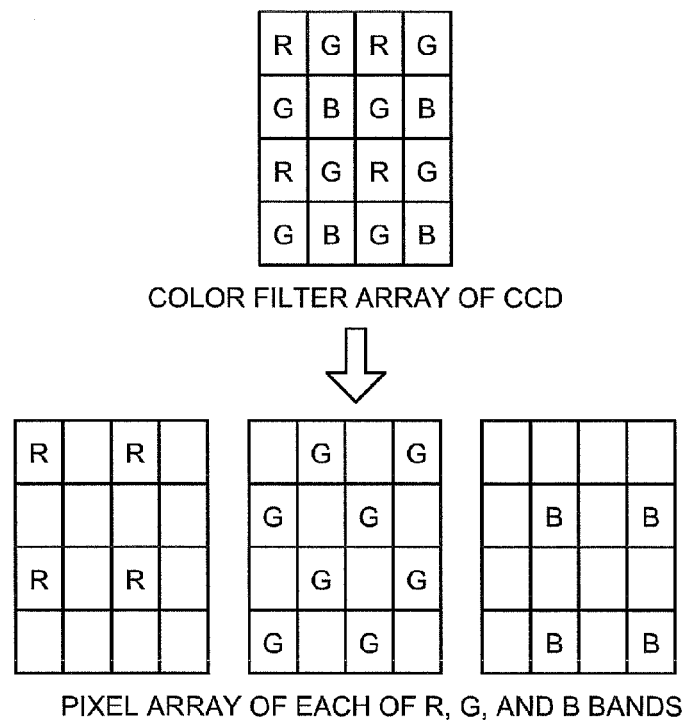
FIG. 2 schematically shows an example of a color filter array and a pixel array of each of R, G, and B bands.

The RGB camera 111, in which mosaic-like color filters for R, G, and B are arranged on a black-and-white imaging element, is widely used in a digital camera and the like. The RGB camera 111 is arranged so that a center of an image to be captured is positioned on an optical axis of the illumination light. FIG. 2 schematically shows an example of a color filter array and a pixel array of each of R, G, and B bands. Though each pixel can image only a component of any one of the R, G, and B in this case, insufficient R, G, and B components can be interpolated by using neighbor pixel values. This method is disclosed in Japanese Patent No. 3510037, for example. When a camera of a three-CCD type is used, R, G, and B components at each pixel can be obtained from the beginning. Though any imaging method can be used in the first embodiment, it is assumed in the description below that R, G, and B components are obtained at each point in the image captured by the RGB camera 111.

Figure 3:
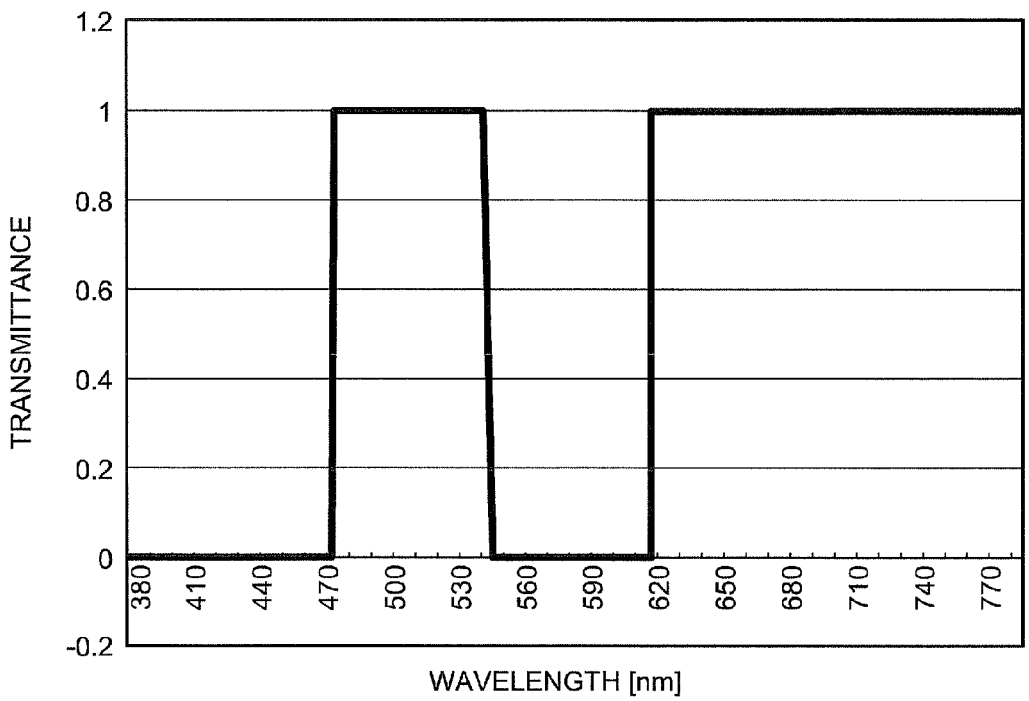
FIG. 3 shows a property of a spectral transmittance of one optical filter.
Figure 4:
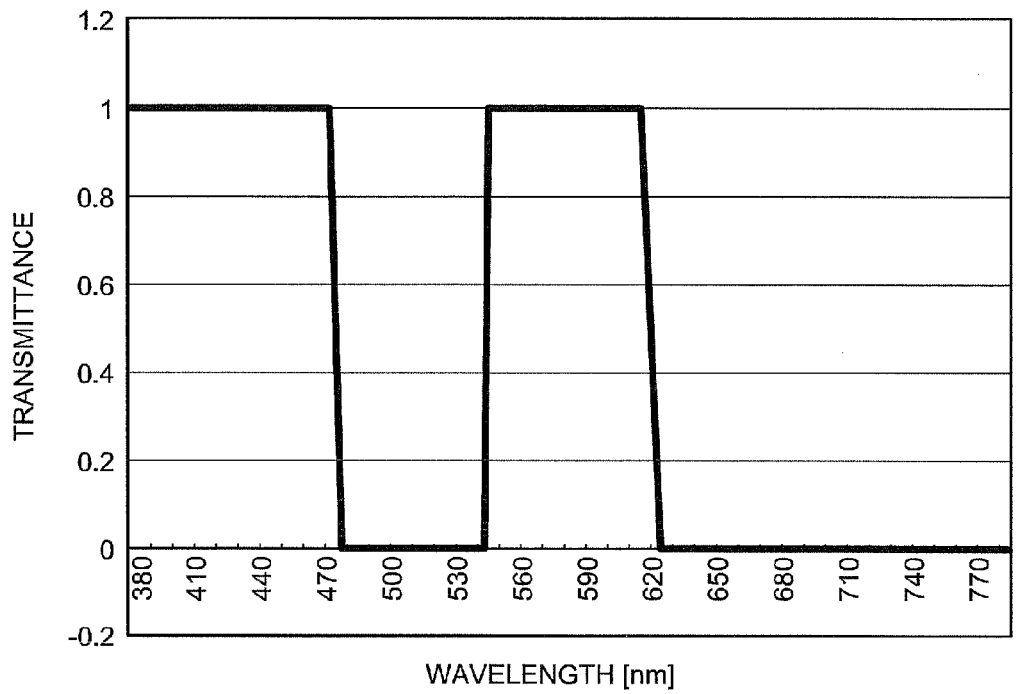
FIG. 4 is shows a property of a spectral transmittance of the other optical filter.

The filter unit 119, which includes two optical filters 1191a and 1191b each of which has a different spectral transmittance property, is configured in such a way that the optical filters 1191a and 1191b are retained by a rotary optical filter switching unit 1193. FIG. 3 shows a spectral transmittance property of one of the optical filters, i.e., the optical filter 1191a, and FIG. 4 shows a spectral transmittance property of the other one of the optical filters, i.e., the optical filter 1191b. For example, a first imaging is first performed by using the optical filter 1191a. Next, the optical filter used is switched to the optical filter 1191b via a rotation of the optical filter switching unit 1193 and a second imaging is performed by using the optical filter 1191b. Through each of the first imaging and the second imaging, an image with three bands is obtained and a multiband image with six bands can be obtained by a combination of both results. The number of the optical filter is not limited to two and three or more optical filters may be used. The stained specimen image which is the obtained multiband image of the stained specimen is stored as an image of the target specimen in a storage unit 150 of the image processing apparatus 1.

Figure 5:
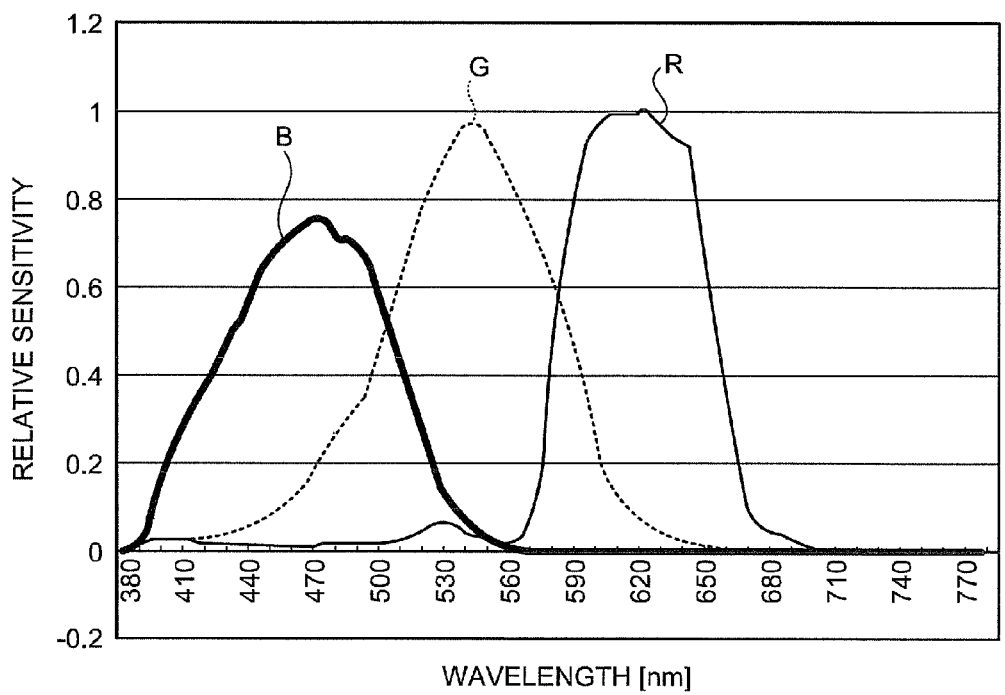
FIG. 5 shows an example of a spectral sensitivity of each of R, G, and B bands.

In this image obtaining unit 110, the illumination light emitted for irradiation by the illumination unit 115 goes through the target specimen S placed on the specimen retaining unit 113. The light transmitted through the target specimen S forms an image on the imaging element of the RGB camera 111 after passing through the optical system 117 and the optical filters 1191a and 1191b. It is only necessary that the filter unit 119 including the optical filters 1191a and 1191b is arranged at any position on an optical path from the illumination unit 115 to the RGB camera 111. An example of a spectral sensitivity of each of the R, G, and B bands at a time of imaging by the RGB camera 111 via the optical system 117 is shown in FIG. 5.

Figure 6:
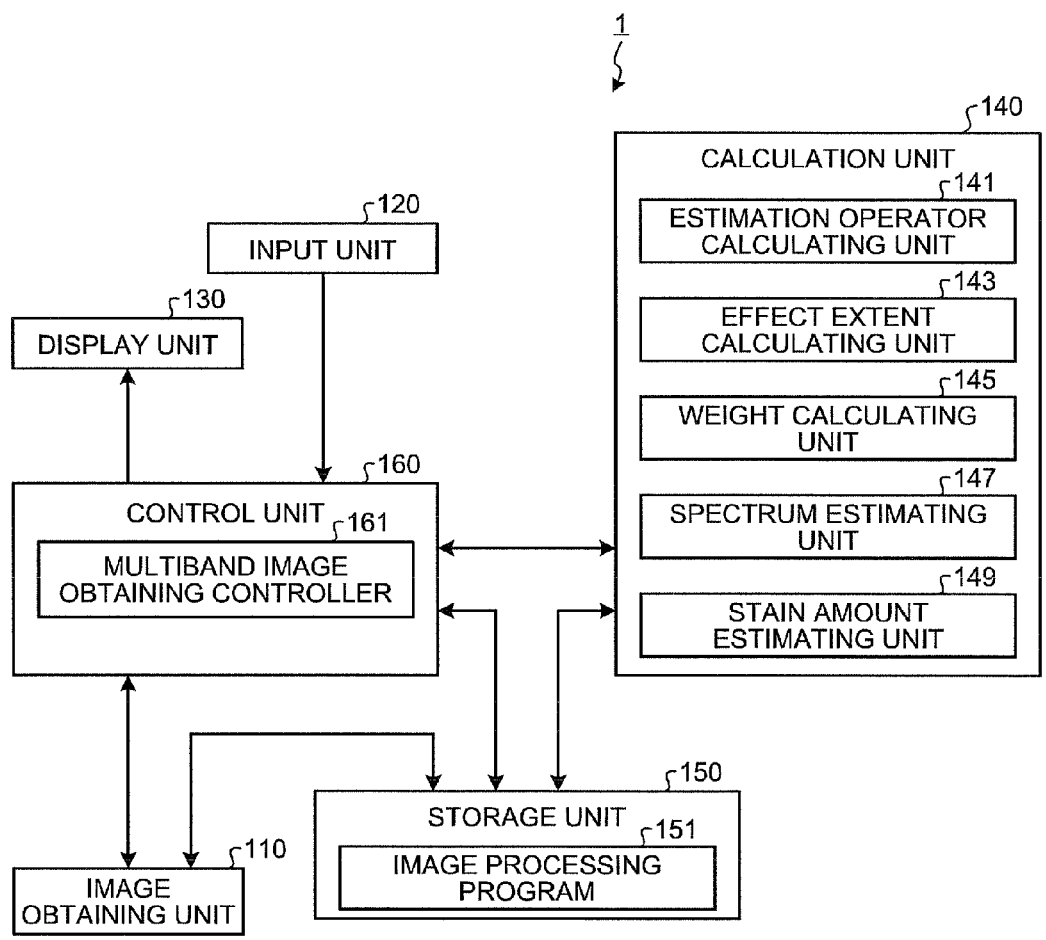
FIG. 6 is a block diagram of a functional structure of an image processing apparatus according to a first embodiment.

FIG. 6 is a block diagram of a functional structure of the image processing apparatus 1 according to the first embodiment. In the first embodiment, the image processing apparatus 1 includes the image obtaining unit 110 already explained with reference to FIG. 1, an input unit 120, a display unit 130, a calculation unit 140, the storage unit 150, and a control unit 160 which controls each part of the apparatus.

The control unit 160 is realized by a hardware such as a CPU. The control unit 160 inclusively controls an entire operation of the image processing apparatus 1 by giving instructions and transmitting data to each part constituting the image processing apparatus 1 based on an operation signal input from the input unit 120, image data input from the image obtaining unit 110, a program and data stored in the storage unit 150, and the like. Besides, the control unit 160 includes a multiband image obtaining controller 161 which controls the operation of the image obtaining unit 110 to obtain the target specimen image.

The input unit 120, which is, for example, realized by an input device of various types such as a keyboard, a mouse, a touch screen, various kinds of switches, and the like, outputs an operation signal according to a manipulated input to the control unit 160. The display unit 130, which is realized by a display device such as an LCD, an ELD, and the like, displays various screens based on a display signal input from the control unit 160.

The calculation unit 140 is realized by a hardware such as a CPU. The calculation unit 140 includes an estimation operator calculating unit 141, an effect extent calculating unit 143, a weight calculating unit 145, a spectrum estimating unit 147, and a stain amount estimating unit 149. The estimation operator calculating unit 141 calculates an estimation operator. The effect extent calculating unit 143 calculates a relative effect extent against a noise (hereinafter referred to as "against-noise relative effect extent") based from the estimation operator. The weight calculating unit 145 calculates a weighting factor used for estimating the stain amount based on the against-noise relative effect extent. The spectrum estimating unit 147 estimates a spectrum (spectral transmittance) of the target specimen based on a pixel value of the target specimen image. The stain amount estimating unit 149 estimates the stain amount of the target specimen based on a reference spectral property of each of the stains, i.e., the hematoxylin and eosin used for staining the target specimen.

The storage unit 150 is realized by an information storing medium, a reader of the information storing medium, and the like. The information storing medium is, for example, an IC memory of various types such as a ROM and a RAM like a flash memory capable of an updating storage, a hard disk which is embedded or connected via a data communication terminal, a CD-ROM, and the like. In the storage unit 150, a program related to the operation of the image processing apparatus 1, a program for realizing various functions included in the image processing apparatus 1, data related to an execution of these programs, and the like are stored. For example, image data of images of the target specimen, data of the estimation operator (Weiner estimation matrix) calculated by the estimation operator calculating unit 141, data of the weighting factors calculated by the weight calculating unit 145, and the like are stored. In addition, an image processing program 151 for realizing: a processing of calculating the weighting factor used for estimating the stain amount by analyzing the against-noise relative effect extent based on the estimation operator (hereinafter referred to as "weighting factor calculating processing"); and a processing of estimating the stain amount of the target specimen by using the weighting factor calculated in the weighting factor calculating processing (hereinafter referred to as "weighted-stain-amount estimating processing") is stored.

Next, a procedure of a processing performed by the image processing apparatus 1 according to the first embodiment will be explained. The image processing apparatus 1 according to the first embodiment executes the weighting factor calculating processing and the weighted-stain-amount estimating processing. The processing explained here is realized by an operation of each part of the image processing apparatus 1 according to the image processing program 151 stored in the storage unit 150.

Figure 7:
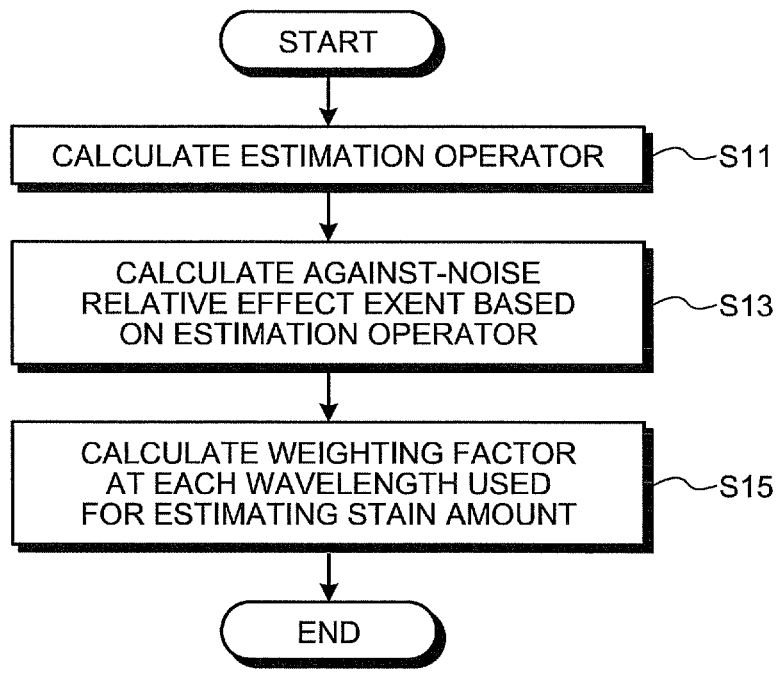
FIG. 7 is a flowchart showing a procedure of a weighting factor calculating processing.

First, the weighting factor calculating processing will be explained with reference to FIG. 7. As shown in FIG. 7, the estimation operator calculating unit 141 calculates an estimation operator W first in the weighting factor calculating processing (step S11). Specifically, the estimation operator W is calculated according to the following equation (5) shown in the description of the related art.

$$W = R_{SS} H^t (HR_{SS} H^t + R_{NN})^{-1} \quad (5)$$

where the system matrix H defined by the following equation (3) is introduced as shown in the description of the related art.

$$H = FSE \quad (3)$$

A spectral transmittance F of the optical filters 1191a and 1191b, a spectral sensitivity property S of the RGB camera 111, and a spectral radiation property E(ˆ) of the illumination per unit of time are measured in advance by using a spectrometer and the like after selecting equipment to be used. Though the spectral transmittance of the optical system 117 approximates 1.0 here, it is only necessary that the spectral transmittance of the optical system 117 is also measured in advance and multiplied by the spectral radiation property E of the illumination when a deviation from the approximate value 1.0 cannot be tolerated. Besides, an autocorrelation matrix $R_{SS}$ of the spectral transmittance of the specimen and an autocorrelation matrix $R_{NN}$ of a noise of the RGB camera 111 are also measured in advance. The $R_{SS}$ can be obtained by preparing an H&E stained typical specimen, measuring by the spectrometer a spectral transmittance at a plurality of points, and calculating the autocorrelation matrix. The $R_{NN}$ can be obtained by obtaining a multiband image by the image obtaining unit 110 in a state where the specimen is not present, obtaining a dispersion of pixel values for each band of the obtained multiband image with six bands, and generating a matrix which includes the obtained dispersion as a diagonal element. Here, it is assumed that no noise correlation is present among bands.

Figure 8:
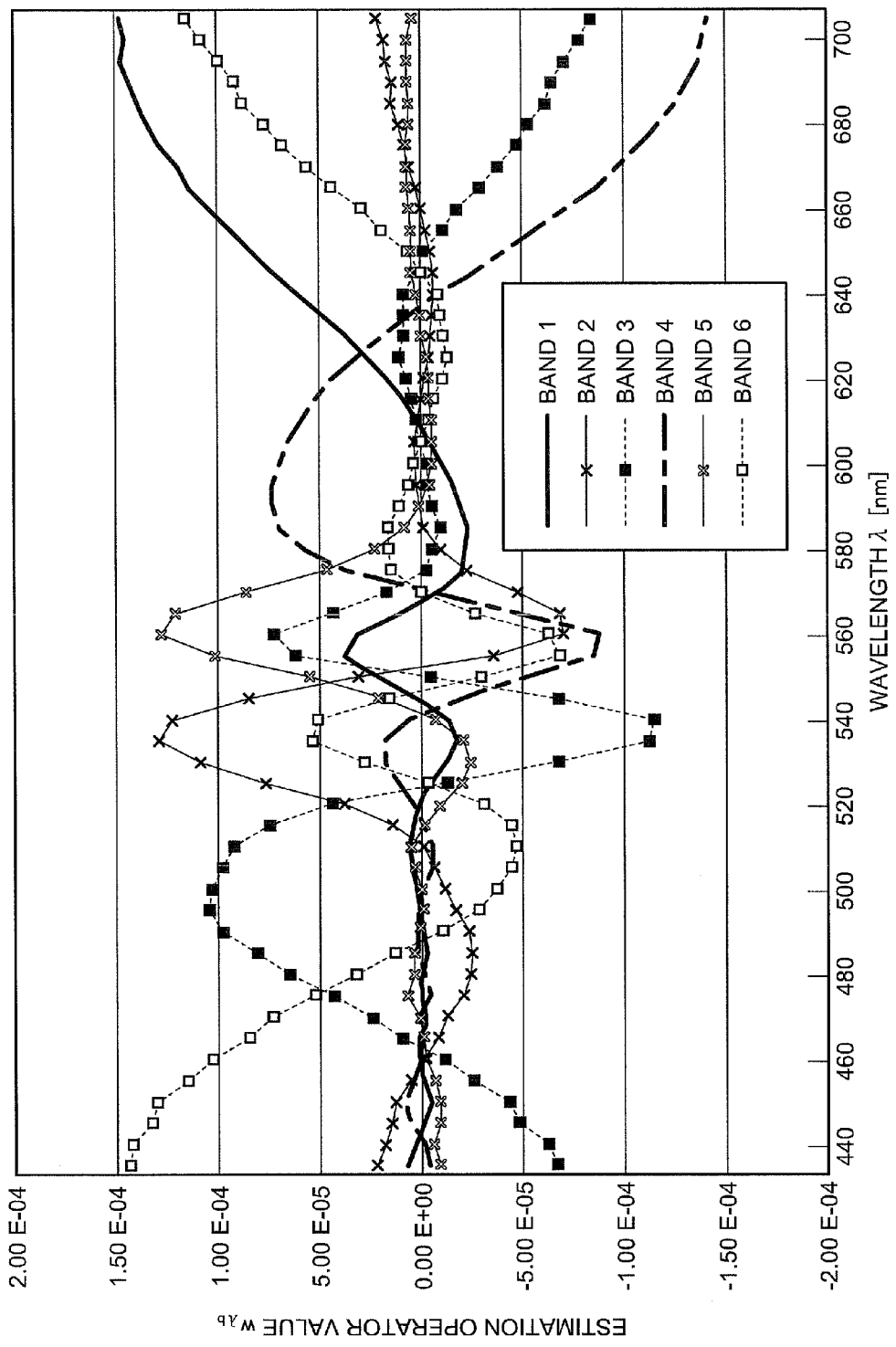
FIG. 8 is a view graphing an estimation operator.

FIG. 8 is a view graphing the estimation operator W, in which a horizontal scale is set as a wavelength λ (nm) and a vertical scale is set as an estimation operator value $W_{\lambda,b}$ of a band b at the wavelength λ, and a value of an element of the estimation operator W corresponding to each wavelength λ (the estimation operator value $W_{\lambda,b}$) is plotted for each band (each of bands 1 to 6). Data of the calculated estimation operator W is stored in the storage unit 150.

Next, as shown in FIG. 7, the effect extent calculating unit 143 calculates the against-noise relative effect extent of each band based on the estimation operator W calculated at step S11 (step S13). Specifically, the against-noise relative effect extent is calculated for each band according to the following equation (10).

$$c_{\lambda b} = \frac{w_{\lambda b}}{\sum_{i=1}^{B} w_{\lambda i}} \quad (10)$$

A symbol B represents the number of bands. A symbol $c_{\lambda,b}$ represents the against-noise relative effect extent of the estimation operator $w_{\lambda,b}$. The $c_{\lambda,b}$ is a value obtained by dividing the estimation operator value wXb of the band b at the wavelength λ by a summation value of estimation operator values of all bands at the wavelength λ (a relative magnitude of the estimation operator value $w_{\lambda,b}$ in a given band b with respect to estimation operator values of all bands at the wavelength λ). In other words, the $c_{\lambda,b}$ means a relative effect extent of the estimation operator value $w_{\lambda,b}$ with respect to the estimation value, which is estimated by using the estimation operator W, of the spectral transmittance of the stained specimen at the wavelength λ. Here, the estimation operator value $w_{\lambda,b}$ is affected similarly whether the input value is an original signal or an observed signal. Therefore, the value of the $c_{\lambda,b}$ means a relative effect extent of each band against the observed noise.

Figure 9:
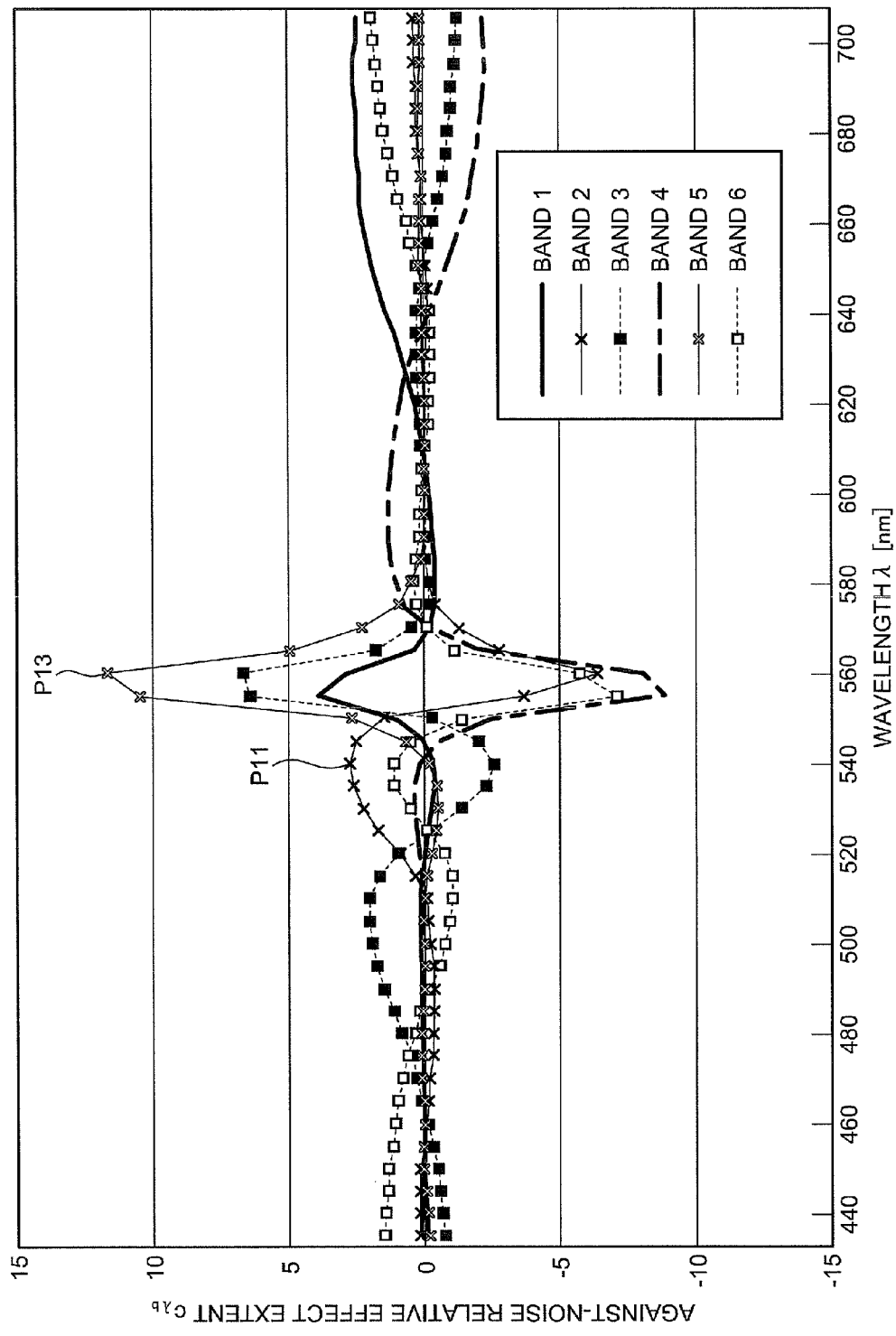
FIG. 9 is a view graphing an example of an against-noise relative effect extent of each band.

FIG. 9 is a view graphing an example of the calculated against-noise relative effect extent $c_{\lambda,b}$ of each band, in which the horizontal scale is set as the wavelength λ (nm) and the vertical scale is set as the against-noise relative effect extent $c_{\lambda,b}$. In the example shown in FIG. 9, the against-noise relative effect extent $c_{\lambda,b}$ of each band in a wavelength range from 540 nm to 560 nm shows a large value compared to other wavelength ranges. In this manner, the against-noise relative effect extent $c_{\lambda,b}$ of each band shows a wavelength dependency against a noise (observed noise). Thus, by calculating and analyzing the against-noise relative effect extent $c_{\lambda,b}$ of each band, it is possible to predict an extent of the effect brought by the observed noise in the spectrum estimation using the estimation operator W, i.e., to predict a noise sensitivity of the estimation operator W. Specifically, it is possible to predict that the against-noise relative effect extent $c_{\lambda,b}$ is easily affected by the observed noise in a wavelength range where the value of the $c_{\lambda,b}$ is large, and a tolerance against the observed noise is poor. On the other hand, it is possible to predict that the against-noise relative effect extent $c_{\lambda,b}$ is not easily affected by the observed noise in a wavelength range where the against-noise relative effect extent $c_{\lambda,b}$ of each band is small, and a tolerance against the observed noise is high. In other words, it is possible to predict that the wavelength range from 540 nm to 560 nm is easily affected by the observed noise compared to other wavelength ranges in the example of FIG. 9. In the first embodiment, a weighing factor $\omega_\lambda$ is calculated for each wavelength by using the against-noise relative effect extent $c_{\lambda,b}$ of each band so that a result of the spectrum estimation in the wavelength range which is not easily affected by the observed noise is easily reflected in the stain amount estimation, and a result of the spectrum estimation in the wavelength range which is easily affected by the observed noise is not easily reflected in the stain amount estimation.

Namely, the weight calculating unit 145 calculates the weighting factor used in estimating the stain amount of the target specimen for each wavelength as shown in FIG. 7 (step S15). Specifically, the against-noise relative effect extent $c_\lambda$ at each wavelength is calculated first from the against-noise relative effect extent $c_{\lambda,b}$ of each band according to the following equation (11).

$$c_\lambda = c_{\lambda,b}^{max} \quad (11)$$

A symbol $c_{\lambda,b}^{max}$ is a maximum value of absolute values of the against-noise relative effect extent $c_{\lambda,b}$ of each band.

Though a maximum value of absolute values of the against-noise relative effect extent $c_{\lambda,b}$ of each band is used here to grasp a radical property, an average value of the absolute values or a norm may be used to obtain the against-noise relative effect extent $c_\lambda$ of each band. For example, when focusing on a band 2 in the example shown in FIG. 9, the against-noise relative effect extent $c_{\lambda,b}$ corresponding to a plot P11 obtained in a wavelength range from 520 nm to 540 nm is calculated as the against-noise relative effect extent $c_\lambda$. Besides, when focusing on a band 5, the against-noise relative effect extent $c_{\lambda,b}$ corresponding to a plot P13 obtained in the wavelength range from 540 nm to 560 nm is calculated as the against-noise relative effect extent $c_\lambda$.

Next, the weighting factor $\omega_\lambda$ at the wavelength $\lambda$ is calculated. Here, the weighting factor $\omega_\lambda$ at the wavelength $\lambda$ is calculated so that the weighting factor $\omega_\lambda$ set in the wavelength range where the against-noise relative effect extent $c_\lambda$ is small is large, and the weighting factor $\omega_\lambda$ set in the wavelength range where the against-noise relative effect extent $c_\lambda$ is large is small in the estimation of the stain amount. For example, the weighting factor $\omega_\lambda$ at the wavelength $\lambda$ is calculated according to the following equations (12), (13), and (14). Besides, the value of the weighting factor $\omega_\lambda$ is set to be large when the against-noise relative effect extent $c_\lambda$ at the wavelength $\lambda$ is small. In addition, the value of the weighting factor $\omega_\lambda$ is set to be small when the against-noise relative effect extent $c_\lambda$ is large.

If $c_\lambda > 1$ and $$\frac{c_\lambda}{\|c\|} \geq \alpha$$

are satisfied:

$$\omega_\lambda = \frac{\|c\|}{c_\lambda} \qquad (12)$$

otherwise:

$$\omega_\lambda = 1 \qquad (13)$$

where $$\|c\| = \sqrt{c_1^2 + c_2^2 + \ldots + c_D^2} \qquad (14)$$

Here, when the number of samples in the wavelength direction is D, $\|c\|$ is a norm of a matrix formed by $c_1, c_2, \ldots, c_D$. A value equal to or less than one is set to the wavelength range where the against-noise relative effect extent $c_\lambda$ is relatively large as the weighting factor $\omega_\lambda$. Besides, when the against-noise relative effect extent $c_\lambda$ is equal to or less than one, the weighting factor $\omega_\lambda$ is set to one even in the case of satisfying $$\frac{c_\lambda}{\|c\|} \geq \alpha$$

since the value is sufficiently small.

Besides, a symbol $\alpha$ is a predetermined threshold value and to what extent the wavelength range where the against-noise relative effect extent $c_\lambda$ is large is utilized for estimating the stain amount is determined based on the value for $\alpha$. When the value for $\alpha$ is set too large, the weighting factor $\omega_\lambda$ always becomes one and thereby comes not to fulfill its own role. On the other hand, when the value for $\alpha$ is set too small, the weighting factor $\omega_\lambda$ is set to all wavelength ranges satisfying $c_\lambda > 1$. For example, the weighting factor $\omega_\lambda$ is set to most wavelength ranges in the example shown in FIG. 9. Therefore, it is necessary to determine and set the value for a based on a result of the stain amount estimation performed in advance without taking the against-noise relative effect extent into consideration so that an accuracy in the estimation becomes the highest.

Here, a value which is equal to or more than zero and equal to or less than one is set to the weighting factor $\omega_\lambda$ for the wavelength range where the against-noise relative effect extent $c_\lambda$ is relatively large. In contrast to this, zero may be set and the wavelength range where the against-noise relative effect extent $c_\lambda$ is relatively large may not be used for the stain amount estimation. Besides, though the weighting factor $\omega_\lambda$ is configured to be set only to the wavelength range where the against-noise relative effect extent $c_\lambda$ is relatively large, the weighting factor $\omega_\lambda$ may be set relatively to all wavelength ranges. Data of calculated weighting factors $\omega_1, \omega_2, \ldots, \omega_D$ is stored in the storage unit 150.

Then, an against-noise relative effect extent c of the estimation operator W is calculated according to the following equation (15).

$$c = c_\lambda^{max} \qquad (15)$$

where $c_\lambda^{max}$ is a maximum value of $c_1, c_2, \ldots, c_D$.

Though the maximum value of $c_1, c_2, \ldots, c_D$ is used here to grasp a radical property, an average value or a norm may be used to obtain the against-noise relative effect extent c of the estimation operator W. For example, the against-noise relative effect extent $c_\lambda$ of the band 5 corresponding to the plot P13 obtained in the wavelength range from 540 nm to 560 nm is calculated as the against-noise relative effect extent c in the example shown in FIG. 9.

The against-noise relative effect extent c obtained here can be used as a criterion which shows a reliability of the estimation operator W and is referred to for evaluating a reliability of the image processing apparatus 1, for example. In other words, when the value of the against-noise relative effect extent c is smaller, the extent of the effect brought by the observed noise in the spectrum estimation is small and the reliability of the estimation operator W is high. On the other hand, when the value of the against-noise relative effect extent c is larger, the extent of the effect brought by the observed noise in the spectrum estimation becomes large and the reliability of the estimation operator W degrades. In evaluating the reliability of the image processing apparatus 1 by using the against-noise relative effect extent c, the reliability of the image processing apparatus 1 is evaluated to be high when the value of the against-noise relative effect extent c is small. On the other hand, the reliability of the image processing apparatus 1 is evaluated to be low when the value of the against-noise relative effect extent c is large.

Figure 10:
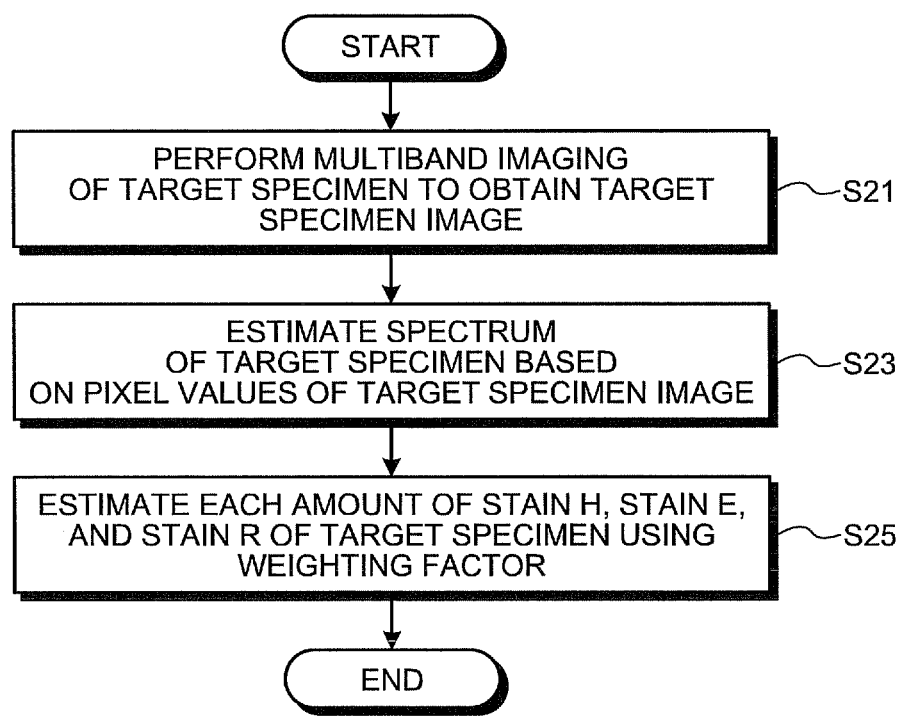
FIG. 10 is a flowchart showing a procedure of a weighted-stain-amount estimating processing.

Subsequently, a procedure of the weighted-stain-amount estimating processing will be explained with reference to FIG. 10. As shown in FIG. 10, first in the weighted-stain-amount estimating processing, the multiband image obtaining controller 161 controls the operation of the image obtaining unit 110, performs a multiband imaging of the target specimen as a target for the stain amount estimation, and obtains the image of the target specimen (step S21).

Next, the spectrum estimating unit 147 estimates the spectrum (spectral transmittance) of the target specimen based on pixel values of the target specimen image obtained at step S21 (step S23). Specifically, the estimation operator W calculated at step S11 in FIG. 7 is used. Then, the estimation value $\hat{T}(x)$ of the spectral transmittance at a corresponding point of the target specimen image is estimated based on the matrix notation G(x) of a pixel value of a pixel at a given point x as an estimation target pixel of the target specimen image according to the following equation (4) shown in the description of the related art. The obtained estimation value $\hat{T}(x)$ of the spectral transmittance is stored in the storage unit 150.

$$\hat{T}(x) = WG(x) \qquad (4)$$

Then, the stain amount estimating unit 149 estimates the stain amount of the target specimen by using the weighting factor $\omega_\lambda$ calculated in the weighting factor calculating processing (FIG. 7) based on the estimation value $\hat{T}(x)$ of the spectral transmittance estimated at step S23 (step S25). Here, the stain amount estimating unit 149 estimates the amount of the hematoxylin (stain H) staining the cell nucleus, the amount of the eosin (stein E) staining the cell cytoplasm, and the amount of the eosin (stain R) staining the red blood cell at the point corresponding to the given point x of the target specimen image based on a reference spectroscopic property of each of the hematoxylin and the eosin used for staining the target specimen. Specifically, each amount of the stain H, the stain E, and the stain R fixed to the point, corresponding to the point x, of the target specimen based on the estimation value $\hat{T}(x)$ of the spectral transmittance at the point x of the target specimen image. In other words, simultaneous equations are set up from equation (9) shown in the description of the related art with respect to a plurality of wavelengths λ and solved for the $d_H$, $d_E$, and $d_R$.

$$-\log \hat{t}(x,\lambda) = k_H(\lambda) \cdot d_H + k_E(\lambda) \cdot d_E + k_R(\lambda) \cdot d_R \quad (9)$$

As an example, when a case of setting up simultaneous equations from equation (9) with respect to three wavelengths $\lambda_1$, $\lambda_2$, and $\lambda_3$ is considered, a matrix notation can be made like the following equation (16).

$$\begin{pmatrix} -\log\hat{t}(x,\lambda_1) \\ -\log\hat{t}(x,\lambda_2) \\ -\log\hat{t}(x,\lambda_3) \end{pmatrix} = \begin{pmatrix} k_H(\lambda_1) & k_E(\lambda_1) & k_R(\lambda_1) \\ k_H(\lambda_2) & k_E(\lambda_2) & k_R(\lambda_2) \\ k_H(\lambda_3) & k_E(\lambda_3) & k_R(\lambda_3) \end{pmatrix} \begin{pmatrix} d_H \\ d_E \\ d_R \end{pmatrix} \quad (16)$$

Here, equation (16) is replaced by the following equation (17).

$$T'(x) = Kd(x) + \epsilon \quad (17)$$

A symbol $T'(x)$ is a matrix which is formed by D rows and one column and deals with $-\log \hat{t}(x,\lambda)$, a symbol K is a matrix which is formed by D rows and three columns and deals with $K(\lambda)$, a symbol $d(x)$ is a matrix which is formed by three rows and one column and deals with the $d_H$, $d_E$, and $d_R$ at the point x, a symbol $\epsilon$ is a matrix which is formed by D rows and one column and deals with an error, and a symbol D is the number of samples in the wavelength direction.

Based on the relational equation (17), the stain amounts $d_H$, $d_E$, and $d_R$ are calculated by using a least-squares method. The least-squares method, which is a method of determining $d(x)$ so that a square sum of an error becomes least in a single regression equation, can be generally calculated in the following equation (18).

$$d(x) = (K^T K)^{-1} K^T T(x) \quad (18)$$

In the first embodiment, the stain amounts $d_H$, $d_E$, and $d_R$ are calculated by adding the weighting factor $\omega_\lambda$ ($\omega_1$, $\omega_2$, ..., $\omega_D$) calculated in the weighting factor calculating processing. Therefore, the following equations (19) and (20) are used.

$$d(x) = (K^T \omega K)^{-1} K^T \omega T(x) \quad (19)$$

where $$\omega = \text{diag}(\omega_1 \omega_2 \ldots \omega_D) \quad (20)$$

A symbol ω represents a matrix which is formed by D rows and D columns and deals with the weighting factor $\omega_\lambda$. A symbol diag( ) represents a diagonal matrix. The data of the stain amounts $d_H$, $d_E$, and $d_R$, estimated by using the weighting factor $\omega_\lambda$ as described above, at the point, corresponding to the point x of the target specimen image, of the target specimen is stored in the storage unit 150. Then, the color of the target specimen image is corrected based on the estimated stain amounts $d_H$, $d_E$, and $d_R$, characteristics of the camera, dispersion of a stain condition, and the like are corrected, and an RGB image for display is composed, for example. The RGB image is displayed on a screen of the display unit 130 and used for a pathological diagnosis.

According to the first embodiment, the against-noise relative effect extent $c_{\lambda,b}$ of each band can be calculated based on the estimation operator W and the against-noise relative effect extent $c_\lambda$ at each wavelength can be calculated. Thus, the extent of the effect brought by the observed noise in the spectrum estimation using the estimation operator W, i.e., the noise sensitivity of the estimation operator W can be predicted. Besides, the weighting factor $\omega_\lambda$ at each wavelength is calculated based on the against-noise relative effect extent $c_\lambda$ at each wavelength, and the stain amount of the target specimen can be estimated by using the calculated weighting factor $\omega_\lambda$. Specifically, the stain amount can be estimated by setting the weighting factor $\omega_\lambda$ in the wavelength range where the against-noise relative effect extent $c_\lambda$ is small to be large and the weighting factor $\omega_\lambda$ in the wavelength range where the against-noise relative effect extent $c_\lambda$ is large to be small. Hence, the stain amount can be estimated by adding an influence of the observed noise incurred in the spectrum estimation using the estimation operator W, so that a degradation in the estimation accuracy can be reduced. Besides, the reliability of the image processing apparatus 1 can be evaluated by using the against-noise relative effect extent c calculated based on the against-noise relative effect extent $c_\lambda$. Consequently, the reliability of the apparatus under an influence of the observed noise incurred in the spectrum estimation using the estimation operator W can be judged properly.

In the first embodiment, the case of obtaining the weighting factor $\omega_\lambda$ with the configuration that the estimation operator calculating unit 141 calculates the estimation operator W and the weight calculating unit 145 calculates the weighting factor $\omega_\lambda$ is explained. In contrast to this, the estimation operator W and the weighting factor $\omega_\lambda$ may be configured not to be calculated each time when the estimation is performed. In other words, at least one of the estimation operator W and the weighting factor $\omega_\lambda$ may be calculated in advance and stored in the storage unit 150. Then, the data of the estimation operator W may be read out from the storage unit 150 and used in the spectral estimation, and the data of the weighting factor $\omega_\lambda$ may be read out from the storage unit 150 and used in the stain amount estimation.

Second Embodiment

Figure 11:
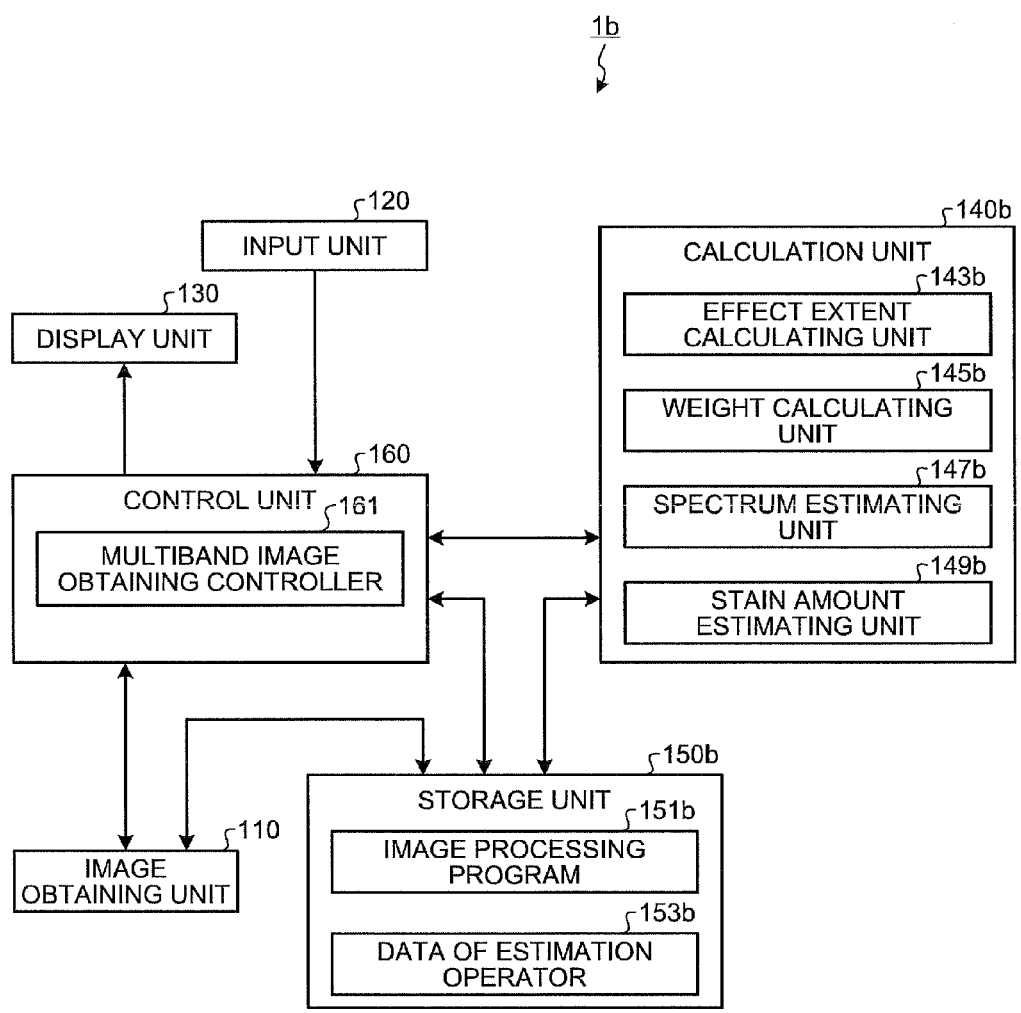
FIG. 11 is a block diagram of a functional structure of an image processing apparatus according to a second embodiment.

A second embodiment will be explained next. FIG. 11 is a block diagram of a functional structure of an image processing apparatus 1b according to the second embodiment. The same constitution as that explained in the first embodiment will be assigned with the same reference symbol. In the second embodiment, the image processing apparatus 1b includes the image obtaining unit 110 explained with reference to FIG. 1, the input unit 120, the display unit 130, a calculation unit 140b, a storage unit 150b, and the control unit 160 which controls each part of the apparatus. The calculation unit 140b includes an effect extent calculating unit 143b, a weight calculating unit 145b, a spectrum estimating unit 147b, and a stain amount estimating unit 149b.

Besides, in the storage unit 150b, data of an estimation operator W (Weiner estimation matrix) which is obtained in advance is stored as estimation operator data 153b. In addition, an image processing program 151b is stored in the storage unit 150b. The image processing program 151b is a program for realizing a processing of calculating a weighting factor used for estimating a stain amount by analyzing a relative effect extent against a noise (hereinafter referred to as "against-noise relative effect extent") based on the estimation operator W stored in the estimation operator data 153b and pixel values of a target specimen image obtained through a multiband imaging of the target specimen, and estimating the stain amount of the target specimen by using the weighting factor.

Figure 12:
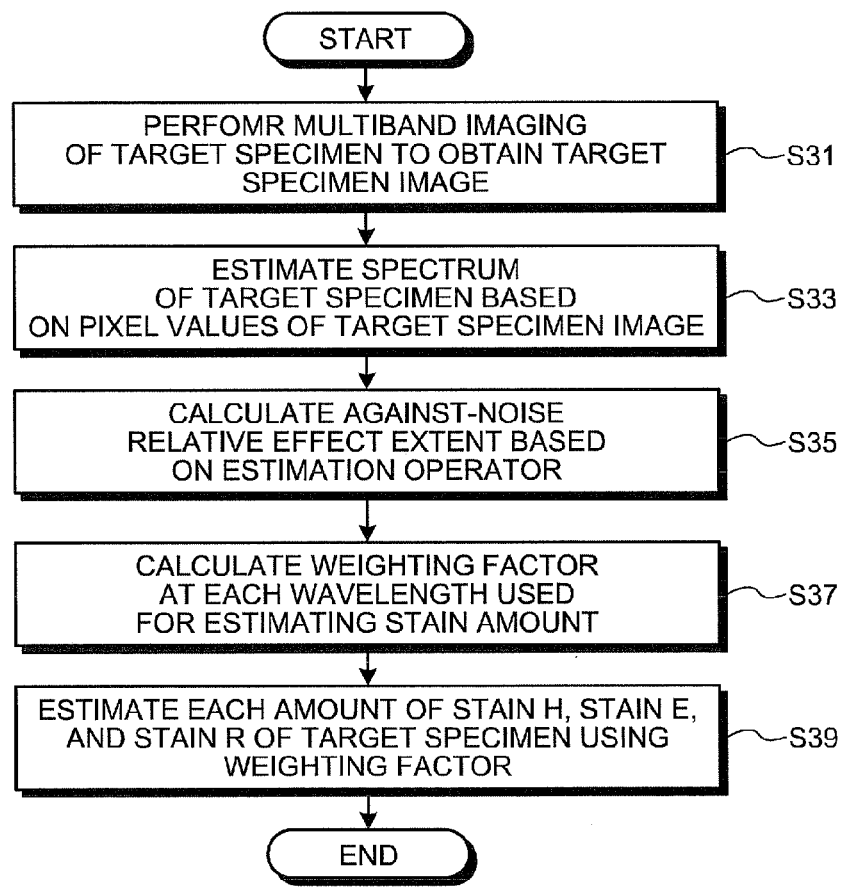
FIG. 12 is a flowchart showing a procedure performed by the image processing apparatus according to the second embodiment.
Figure 13:
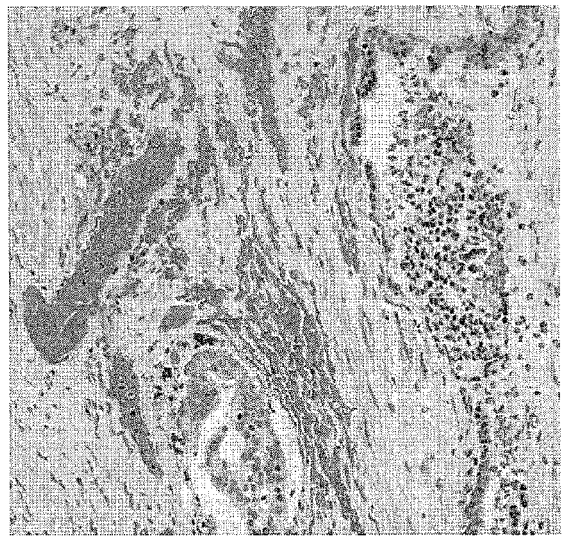
FIG. 13 shows an example of an RGB image.

FIG. 12 is a flowchart showing a procedure of a processing performed by the image processing apparatus 1b according to the second embodiment. The processing explained here is realized by an operation of each part of the image processing apparatus 1b according to the image processing program 151b stored in the storage unit 150b.

First, the multiband image obtaining controller 161 controls the operation of the image obtaining unit 110, performs a multiband imaging of the target specimen as an target for the stain amount estimation, and obtains the target specimen image (step S31). Next, the spectrum estimating unit 147b reads out the estimation operator W from the estimation operator data 153b. Then, the spectrum estimating unit 147b uses the estimation operator W and estimates a spectrum (spectral transmittance) of the target specimen based on pixel values of the target specimen image obtained at step S31 (step S33).

Subsequently, the effect extent calculating unit 143b calculates the against-noise relative effect extent for each band based on the estimation operator W read out from the estimation operator data 153b and the pixel values of the target specimen image obtained at step S31 (step S35). Specifically, the against-noise relative effect extent $c_{\lambda,b}$ of each band is calculated according to the following equation (21).

$$c_{\lambda b} = \frac{w_{\lambda b} g(b)}{\sum_{i=1}^{B} w_{\lambda i} g(i)} \qquad (21)$$

A symbol B represents the number of bands. A symbol g(b) is a pixel value at a point x as an estimation target pixel of the band b in the target specimen image. In this manner, the against-noise relative effect extent $c_{\lambda,b}$ of each band is calculated by using the pixel value of the estimation target pixel in addition to the estimation operator value $w_{\lambda,b}$ in the second embodiment.

Then, the weight calculating unit 145b calculates the weighting factor at each wavelength (step S37). The method of calculating the weighting factor is the same as that in the first embodiment. Namely, the against-noise relative effect extent $c_\lambda$ at each wavelength is calculated first from the against-noise relative effect extent $c_{\lambda,b}$ of each band obtained at step S35 according to equation (11). Next, the weighting factor $\omega_\lambda$ at the wavelength λ is calculated from the against-noise relative effect extent $c_\lambda$ at each wavelength according to equations (12) to (14). Besides, the against-noise relative effect extent c of the estimation operator W as a value for evaluating the reliability of the image processing apparatus 1b is calculated according to equation (15). The against-noise relative effect extent c obtained here is referred to for evaluating the reliability of the image processing apparatus 1b similarly to the first embodiment.

The stain amount estimating unit 149b estimates the stain amount of the target specimen by using the weighting factor $\omega_\lambda$ calculated at step S37 based on the estimation value $\hat{T}(x)$ of the spectral transmittance estimated at step S33 (step S39). The method of estimating the stain amount is the same as that in the first embodiment.

According to the second embodiment, the against-noise relative effect extent $c_{\lambda,b}$ for each band can be calculated based on the estimation operator W and the pixel value g(b) for each band in the target specimen image, and the against-noise relative effect extent $c_\lambda$ at each wavelength can be calculated with the same advantageous effects as the first embodiment. Thus, the effect brought by the observed noise in the spectrum estimation using the estimation operator W, i.e., the noise sensitivity of the estimation operator W can be predicted by using pixel values of the target specimen image.

In the second embodiment, the case of calculating the against-noise relative effect extent $c_{\lambda,b}$ for each band by using the pixel value of the estimation target pixel is explained. In contrast, the against-noise relative effect extent $c_{\lambda,b}$ for each band may be analyzed in advance with respect to a plurality of pixel values, and the weighting factor $\omega_\lambda$ may be calculated and stored in the storage unit 150b. Then, in the stain amount estimation, data of the most suitable weighting factor $\omega_\lambda$ may be read out from the storage unit 150b and used according to the pixel value of the estimation target pixel. For example, pixel values may be sampled at a predetermined range and the weighting factor $\omega_\lambda$ may be calculated for each of the sampled pixel values. Then, in the stain amount estimation, the weighting factor $\omega_\lambda$ for a pixel value which is most close to the pixel value of the estimate target pixel is used to estimate the stain amount. Alternatively, the weighting factor $\omega_\lambda$ may be calculated for each of tissues such as the cell nucleus, the cell cytoplasm, the red blood cell, and the background which are captured in the image of the target specimen. Specifically, the weighting factor $\omega_\lambda$ for each tissue may be calculated by using a pixel value typical of each tissue. Then, in the stain amount estimation, the tissue at a corresponding specimen point is specified based on the pixel value of the estimation target pixel, and the weighting factor $\omega_\lambda$ according to the specified tissue is used to estimate the stain amount.

Besides, though the case of calculating the estimation operator W in advance is explained in the second embodiment, the estimation operator W may be calculated each time when the estimation is performed.

Moreover, though the case of estimating a spectrum characteristic value of the spectral transmittance from the multiband image capturing a pathological specimen in the embodiments described above, a case of estimating a spectrum characteristic value of a spectral reflectance as a value for a spectroscopic property is similarly applicable.

The image processing apparatus, and the reliability evaluation method and the computer program product of the image processing apparatus are advantageous in that the effect extent brought by a noise can be predicted in estimating the spectroscopic property using the estimation operator since the relative effect extent against the noise can be analyzed based on the estimation operator used for the estimation of the spectroscopic property.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which uses an estimation operator to estimate a spectroscopic property, comprising:

an estimation operator calculating unit which calculates, based on an obtained multiband image, estimation operator values of respective bands corresponding to respective wavelengths by using the estimation operator; and an effect extent analyzing unit which analyzes a relative effect extent against observed noise of each band in a wavelength axis based on the estimation operator value of a band at a wavelength and on a summation value of the estimation operator values of all bands at the wavelength.

2. The image processing apparatus according to claim 1, further comprising a weighting factor setting unit which sets a weighting factor at each wavelength based on the relative effect extent against observed noise analyzed by the effect extent analyzing unit.

3. The image processing apparatus according to claim 2, further comprising:

a spectroscopic property estimating unit which uses the estimation operator to estimate, based on an image capturing a stained specimen, a spectroscopic property of the stained specimen; and a stain amount estimating unit which estimates a stain amount of the stained specimen based on the spectroscopic property estimated by the spectroscopic property estimating unit and on the weighting factor set by the weighting factor setting unit.

4. The image processing apparatus according to claim 2, wherein the weighting factor setting unit makes the weighting factor small, the weighting factor being set with respect to a wavelength at which the relative effect extent against observed noise is large.

5. The image processing apparatus according to claim 2, wherein the weighting factor setting unit makes the weighting factor zero when the weighting factor which is set with respect to a wavelength at which the relative effect extent against observed noise is large.

6. The image processing apparatus according to claim 1, wherein the effect extent analyzing unit analyzes the relative effect extent against observed noise by using pixel values of an image capturing a stained specimen.

7. A reliability evaluation method of an image processing apparatus which uses an estimation operator to estimate a spectroscopic property, the method comprising:

calculating, based on an obtained multiband image, estimation operator values of respective bands corresponding to respective wavelengths by using the estimation operator; and analyzing a relative effect extent against observed noise of each band in a wavelength axis based on the estimation operator value of a band at a wavelength and on a summation value of the estimation operator values of all bands at the wavelength.

8. A computer program product having a computer readable recording device including programmed instructions for estimating a spectroscopic property by using an estimation operator, wherein the instructions, when executed by a computer, cause the computer to perform:

calculating, based on an obtained multiband image, estimation operator values of respective bands corresponding to respective wavelengths by using the estimation operator; and analyzing a relative effect extent against observed noise of each band in a wavelength axis based on the estimation operator value of a band at a wavelength and on a summation value of the estimation operator values of all bands at the wavelength.

\* \* \* \* \*